(12) United States Patent
Thorwirth

(10) Patent No.: US 10,045,093 B2
(45) Date of Patent: *Aug. 7, 2018

(54) SYSTEMS AND METHODS FOR SECURING CONTENT DELIVERED USING A PLAYLIST

(71) Applicant: Verimatrix, Inc., San Diego, CA (US)

(72) Inventor: Niels J. Thorwirth, San Diego, CA (US)

(73) Assignee: Verimatrix, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/389,256

(22) Filed: Dec. 22, 2016

(65) Prior Publication Data
US 2017/0208372 A1   Jul. 20, 2017

Related U.S. Application Data

(63) Continuation of application No. 13/579,020, filed as application No. PCT/US2011/025341 on Feb. 17, 2011, now Pat. No. 9,532,113.
(Continued)

(51) Int. Cl.
*H04L 29/06* (2006.01)
*H04N 21/8358* (2011.01)
(Continued)

(52) U.S. Cl.
CPC .......... *H04N 21/8358* (2013.01); *H04L 9/14* (2013.01); *H04N 21/23439* (2013.01);
(Continued)

(58) Field of Classification Search
CPC .......... H04N 21/8358; H04N 21/8456; H04N 21/8586; H04N 21/26258; H04N 21/6125; H04N 21/23439
See application file for complete search history.

(56) References Cited

U.S. PATENT DOCUMENTS 7,555,650 B1   6/2009 Zhao et al.
7,925,774 B2   4/2011 Zhang et al.
(Continued)

FOREIGN PATENT DOCUMENTS

EP   3333741 A1   6/2018
WO   2011103364 A1   8/2011

OTHER PUBLICATIONS

International Preliminary Report on Patentability for International Application PCT/US2011/025341, dated Aug. 21, 2012, 7 Pgs.
(Continued)

*Primary Examiner* — Mahfuzur Rahman
(74) *Attorney, Agent, or Firm* — KPPB LLP (57) ABSTRACT

Systems and methods in accordance with embodiments of the invention enhance the security of content distribution using individualized playlists. In many embodiments, a playlist is individually composed for a client device so that the selection of content included in the playlist encodes information. One embodiment includes generating a watermark sequence, where each watermark sequence is a unique identifier, selecting between alternative chunks of encoded content based upon the watermark sequence, where each of the alternative chunks of encoded content includes the same perceptual content and differs in the way it is watermarked, and listing the selected chunks in a playlist, where content assembled using the playlist includes a unique watermark sequence.

27 Claims, 4 Drawing Sheets

Related U.S. Application Data (60) Provisional application No. 61/333,909, filed on May 12, 2010, provisional application No. 61/305,398, filed on Feb. 17, 2010.

(51) Int. Cl.

| | |
|---|---|
| H04N 21/2343 | (2011.01) |
| H04N 21/262 | (2011.01) |
| H04N 21/61 | (2011.01) |
| H04N 21/858 | (2011.01) |
| H04N 21/2389 | (2011.01) |
| H04L 9/14 | (2006.01) |

(52) U.S. Cl.
CPC . *H04N 21/23892* (2013.01); *H04N 21/23895* (2013.01); *H04N 21/26258* (2013.01); *H04N 21/6125* (2013.01); *H04N 21/8586* (2013.01)

(56) References Cited

U.S. PATENT DOCUMENTS

| | | | |
|---|---|---|---|
| 8,515,123 | B2 | 8/2013 | Thorwirth |
| 9,532,113 | B2 | 12/2016 | Thorwirth |
| 2003/0187679 | A1 | 10/2003 | Odgers et al. |
| 2003/0190054 | A1 | 10/2003 | Troyansky et al. |
| 2004/0260930 | A1 | 12/2004 | Malik et al. |
| 2005/0204168 | A1 | 9/2005 | Johnston et al. |
| 2006/0101269 | A1 | 5/2006 | Moskowitz et al. |
| 2007/0283448 | A1 | 12/2007 | Green |
| 2007/0291979 | A1 | 12/2007 | Thorwirth |
| 2009/0041237 | A1 | 2/2009 | Takashima et al. |
| 2009/0158318 | A1 | 6/2009 | Levy |
| 2010/0158101 | A1 | 6/2010 | Wu et al. |
| 2012/0045054 | A1 | 2/2012 | Main et al. |
| 2013/0054972 | A1 | 2/2013 | Thorwirth |

OTHER PUBLICATIONS

International Search Report for International Application No. PCT/US2011/025341, Search Completed Apr. 8, 2011, dated Apr. 19, 2011, 2 pgs.

Supplementary European Search Report for Application No. EP11745281, dated Sep. 30, 2013, 8 pgs.

Fecheyr-Lippens, A., "A Review of HTTP Live Streaming", Internet Citation XP002638990, Retrieved from the Internet: URL: http://issuu.comjandrubyjdocsjhttp live streaming, Jan. 25, 2010, 37 pages.

Jarnikov, Dmitri et al., "A Watermarking System for Adaptive Streaming", White Paper, Irdeto, the Netherlands, Feb. 28, 2014, 12 pages.

Pantos, R., "HTTP Live Streaming,draft-pantos-http-live-streaming-02.txt", HTTP Live Streaming; Draft-Pantos-HTTP-Live-Streaming-02.txt, Internet Engineering Task Force, IETF; Standardworkingdraft,, Interent Society (ISOC) 4, Rue Des Falaises CH—1205 Geneva, Switzerland no. 2 XP015064407, Oct. 5, 2009, 20 pages.

Extended European Search Report for European Application No. 17197753.1, Search completed Mar. 21, 2018, dated Apr. 3, 2018, 6 Pgs.

Cox et al., "Digital Watermarking and Steganography", Second Edition, The Morgan Kaufmann Series in Multimedia Information and Systems, Nov. 27, 2007, 587 pages.

SYSTEMS AND METHODS FOR SECURING CONTENT DELIVERED USING A PLAYLIST

CROSS-REFERENCE TO RELATED APPLICATIONS

The present application is a continuation of U.S. patent application Ser. No. 13/579,020 entitled "Systems and Methods for Securing Content Delivered Using a Playlist" to Niels J. Thorwirth, filed Nov. 7, 2012, which application is a national stage of PCT Patent Application No. PCT/US11/25341 entitled "Systems and Methods for Securing Content Delivered Using a Playlist" to Niels J. Thorwirth, filed Feb. 17, 2011, which application claims priority to U.S. Provisional Application No. 61/333,909, entitled "Securing Content Access Using Destination Links" to Niels J. Thorwirth, filed May 12, 2010, and U.S. Provisional Application No. 61/305,398, entitled "Securing Content Delivered Using a Playlist" to Niels J. Thorwirth, filed Feb. 17, 2010, the disclosures of which are incorporated herein by reference in their entirety.

FIELD OF THE INVENTION

The present invention generally relates to securing digital content and more specifically relates to securing digital content accessible via a playlist using digital watermarking and encryption.

BACKGROUND

The term "content" can be used to describe digital media such as audio, video, an image, a collection of images or a combination thereof. A digital content file can include several streams of audio, video and text in different tracks. Different tracks may contain different video programs, alternative audio tracks for different languages, and/or text for subtitles. Content is typically encoded or compressed for efficient transmission and storage. Common encoding formats include MPEG-2, VC-1 and H.264 for video and mp3 (i.e. MPEG-1 Audio Layer 3), AAC and Ogg Vorbis for audio.

"Sections" are parts of a content file. Typically, they contain temporal sections (i.e. a subsection of a piece of content in time such as a number of video frames, group of pictures or audio samples). In many instances, sections contain several seconds of encoded content and the sections in a content file are of similar duration. Other variations include sections that contain the entire media file. Sections can also be created from a partition of a file including but not limited to in areas of an image or video frame, pages of a text document, channels of video in a multi channel video stream, channels of a multi channel audio stream (such as stereo, surround sound, multi language versions), channels of a stereo or 3D video, and/or groups of bytes in a bitstream.

Sections may be created by actual separation of a file into multiple files or they may be created within a file. Creation of sections within a file can be realized by creating pointers to sections or an index within a container file that allow for fast random access to individual sections. The creation of sections within a file can be further enhanced by grouping content within separate structures within the file. Sections can also be created on the fly where the section is determined just before it is requested or used.

Chunks are sections that are prepared to be retrieved by a client via a "playlist". Typically, several alternative chunks are created from every section. These chunks contain the same perceptual content (e.g. the same 2 seconds of content in a video file). Commonly those chunks differ in their encoding and/or bitrate (e.g. in adaptive bitrate streaming systems). Different bitrates are typically created by compressing using different levels of lossy compression, and different video resolutions. Other variations to create chunks from sections include: variation in compression codecs or number of channels, video 2D/3D video, bit depth of audio samples, bit depth of video samples, additional channels for audio such as stereo surround sound channels, compression codecs that differ in decoding complexity in order to support adaption to processing performance of the playback client and DRM systems and different content that can be chosen by or targeted to an individual as is the case in targeted advertisement.

A "client device" typically is an electronic device that implements a media player. It typically retrieves content from a server via a network but may also play back content from a local storage device or physical media such as a DVD, a Blu-ray disc, other optical discs, a USB memory stick, or another storage device. Client devices can include Set Top Boxes, desktop and laptop computers, cell phones, tablet devices, game consoles, mp3 players, portable media players and other media players. The client device is interpreting the playlist and as such may reside on the head-end where the playlist is executed to assemble content according to its destination.

The term "streaming" describes the playback of content on a client device, where the content is stored on a server and continuously sent to the client device over a network during playback. Typically, the client device stores a sufficient quantity of content in a buffer at any given time during playback to prevent disruption of playback due to the playback device completing playback of all the buffered content prior to receipt of the next portion of content. The client may also store the streamed content locally for later playback. Adaptive bit rate streaming or "adaptive streaming" involves detecting the present streaming conditions (e.g. the user's network bandwidth and CPU capacity) in real time and adjusting the quality of the streamed media accordingly. Typically, the source media is encoded at multiple bit rates and the client device switches between streaming the different encodings depending on available resources. Alternatively this choice may be made by the server as it evaluates the connection quality of an individual connection.

Adaptive streaming may use common protocols like the Hypertext Transfer Protocol (HTTP), published by the Internet Engineering Task Force and the World Wide Web Consortium as RFC 2616, or Real Time Streaming Protocol (RTSP), published by the Internet Engineering Task Force as RFC 2326, to stream media between a server and a playback device. HTTP is a stateless protocol that enables a playback device to request a file or a byte range within a file. HTTP is described as stateless, because the server is not required to record information concerning the state of the playback device requesting information or the byte ranges requested by the playback device in order to respond to requests received from the playback device. RTSP is a network control protocol used to control streaming media servers. Playback devices issue control commands, such as "play" and "pause", to the server streaming the media to control the playback of media files. When RTSP is utilized, the media server records the state of each client device and determines the media to stream based upon the instructions received from the client device.

In adaptive streaming systems, the source media is often organized on a media server with the help of a top level index file pointing to a number of alternate streams that contain the actual video and audio data. Different adaptive streaming solutions can utilize different index and media containers. The Synchronized Multimedia Integration Language (SMIL) developed by the World Wide Web Consortium is utilized to create indexes in several adaptive streaming solutions including IIS Smooth Streaming developed by Microsoft Corporation of Redmond, Wash., and Flash Dynamic Streaming developed by Adobe Systems Incorporated of San Jose, Calif. HTTP Adaptive Bitrate Streaming developed by Apple Computer Incorporated of Cupertino, Calif. organizes media files via an extended M3U playlist file (.M3U8), which is a text file containing a list of URIs that typically identify media chunks. Today's most commonly used media container formats are the MP4 container format specified in MPEG-4 Part 14 (i.e. ISO/IEC 14496-14) and the MPEG transport stream (TS) container specified in MPEG-2 Part 1 (i.e. ISO/IEC Standard 13818-1). The MP4 container format is utilized in IIS Smooth Streaming and Flash Dynamic Streaming. The TS container is used in HTTP Adaptive Bitrate Streaming.

The term "playlist" can be used to describe a list of chunks or links to chunks for playback. A playlist may also contain a selection that allows adapting to user preferences such as playback order, language settings or bandwidth consumption or device capabilities such as 3D display, surround sound and DRM support. The M3U playlist file utilized in HTTP Adaptive Bitrate Streaming is an example of a file containing a playlist (i.e. a list of URLs pointing to TS container files that contain alternative chunks for the sections of a piece of content). A playlist can also be distributed across multiple files. For example, in IIS Smooth Streaming a list of URLs is provided as a SMIL file and each container referenced in the SMIL file contains an index. Together the SMIL top level index file and the indexes within in each of the container files can provide a complete index to all of the alternative chunks for the different sections of a piece of content. A playlist is typically used by a media player running on a client device but can also be used to assemble content in preparation for further distribution. Common formats for playlists include: M3U, RAM, Winamp B4S, Advanced Stream Redirector (ASX) with variation of ASX and WVX, WPL, PLS, Kapsule and KPL, SMIL, iTunes Library, DAAP, Creative Commons RDF and XML Shareable Playlist Format (XSPF).

A playlist is typically interpreted on the client but may also be used on the server to assemble content before final delivery to a client (e.g. Flash Dynamic Streaming). Examples where a playlist is interpreted on the server also include individual content composition for each client, or server side adaption to the available bitrate and client capabilities.

A "link" is an entry in a playlist pointing to a content file or content chunk. A link can be expressed as a URL or filename. It may point to a local or remote file and/or a location within a local or remote file. The file may be an existing file or it may be created and prepared on the fly while it is requested via the client.

Figure 1:
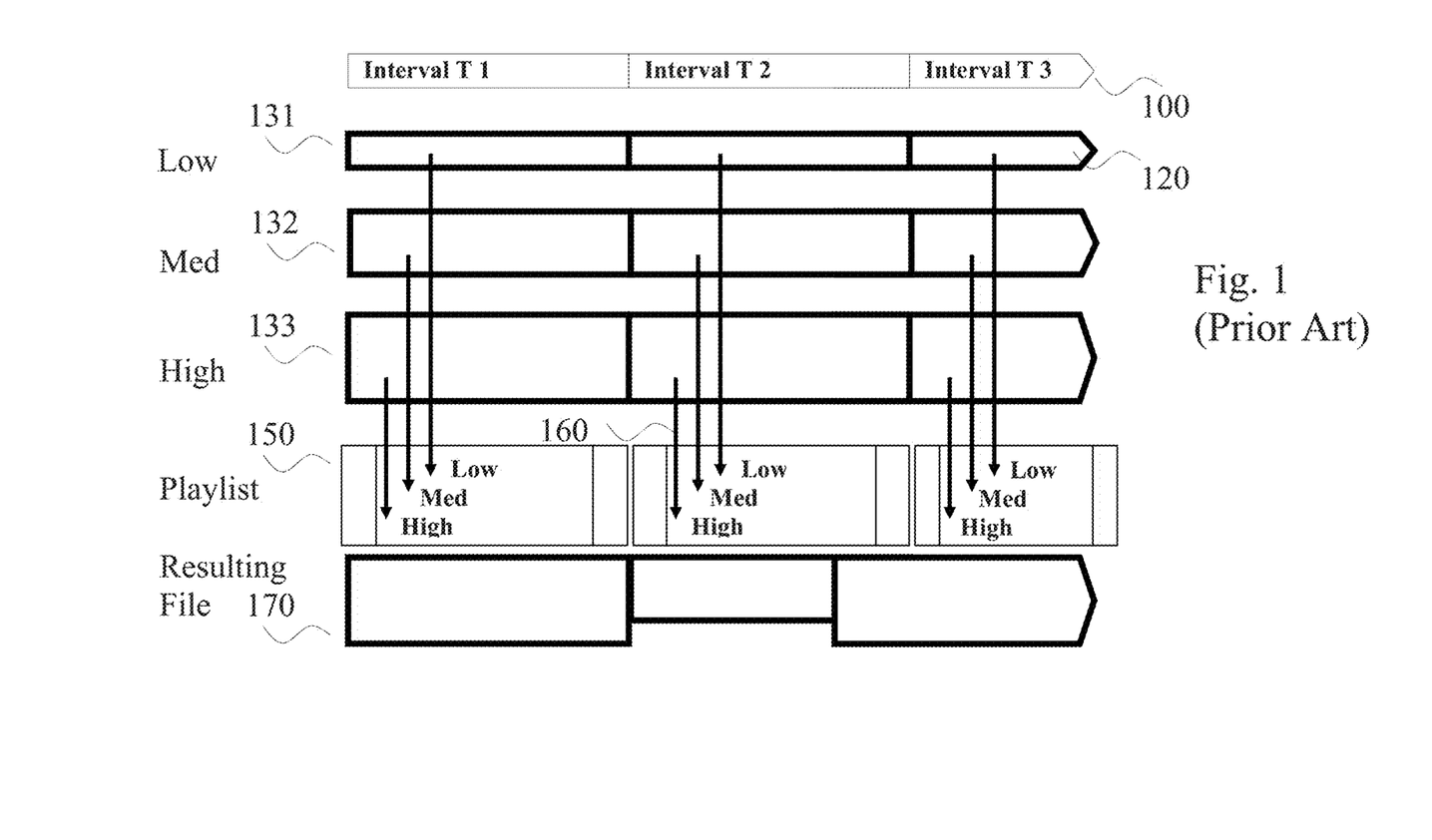
FIG. 1 illustrates prior processes for preparing content for adaptive streaming.

A process that can be used to prepare content for use in a typical adaptive streaming system is illustrated in FIG. 1. The content is divided into temporal sections, depicted as T1, T2 and T3 (100). Each section is compressed with three different bitrates Low (131), Medium (132) and High (133). A first chunk 120 is a chunk for the low bitrate of section T3. The Low bitrate has the smallest data size and lowest quality. Consecutive chunks of different bitrates can be played consecutively without duplicated or skipped content.

For adaptive streaming, links (160) to all three chunks of each temporal section can be provided in a playlist (150) to the client device. The client device adapts the bitrate during playback according to its playback environment by selecting the best chunk for each section. The best chunk typically is the chunk with the highest bitrate that can be played without interruption. In the example shown in FIG. 1, the content (170) streamed to the client device is composed of High, Med, High bitrate for corresponding Sections T1, T2, T3. The client device may have chosen to reduce the bitrate for section T2, because it did not have sufficient bandwidth to download the chunk with the High bitrate fast enough to play without interruption.

The term "digital watermarking" can be used to describe processes that embeds imperceptible, robust and secure information in content. One application is embedding recipient information in the content in order to identify individuals that receive the content and distribute the content in an unauthorized manner.

There are different approaches to applying digital watermarks to content files. One application is to embed the mark on the server before the content is delivered to a client device. One possibility is to mark the content "on the fly" as the file is requested from the client. For example, by using an approach as described in U.S. patent Ser. No. 13/002,280, entitled "Efficient Watermarking Approaches of Compressed Media", filed Dec. 30, 2010, the disclosure of which is incorporated by reference herein. Another approach is to prepare the content with different sections that are perceptually identical but contain different information and to assemble the sections during delivery in a way that represents the information to be embedded as described in U.S. Pat. No. 7,555,650, entitled "Techniques for reducing the computational cost of embedding information in digital representations", filed Mar. 17, 2003. Several watermark systems that embed information in content files and that can be applied to sections and chunks have been described in the prior art. Such systems apply noise patterns, DCT transformation or luminance variations in the content in order to embed information. An overview can be found in Cox et al., "Digital Watermarking and Steganography" ($2^{nd}$ Ed., 2007). The information that is embedded using a digital watermark is called the payload. It often represents a number that relates to a user, device or content owner. Transformations are typically applied to the payload for security and reliability such as encryption, error correction and/or error detection codes. Payloads are often stored repeatedly within the content in order to enhance the robustness with an increase in redundancy.

If content is delivered using a playlist and adaptive streaming, it is not known prior to streaming what parts of the content will be accessed. If the content is prepared for each client in all available bitrates and maintained for the entire duration of possible access by the client, the resulting overhead in processing storage created is significant if not prohibitive.

SUMMARY OF THE INVENTION

Systems and methods in accordance with embodiments of the invention enhance the security of content distribution using individualized playlists. In many embodiments, a playlist is individually composed for a client device so that the selection of content included in the playlist encodes information. One embodiment includes generating a watermark sequence, where each watermark sequence is a unique identifier, selecting between alternative chunks of encoded content based upon the watermark sequence, where each of the alternative chunks of encoded content includes the same perceptual content and differs in the way it is watermarked, and listing the selected chunks in a playlist, where content assembled using the playlist includes a unique watermark sequence.

In a further embodiment, at least one of the alternative chunks includes an imperceptibly embedded watermark, and one of the alternative chunks is unmodified.

In another embodiment, each of the alternative chunks includes a different imperceptibly embedded watermark.

In a still further embodiment, each of the alternative chunks includes a different amount of embedded information.

In still another embodiment, the number of alternative chunks differs for different sections of the content.

In a yet further embodiment, selecting between alternative chunks of encoded content based upon the watermark sequence further includes selecting between alternative groups of chunks based upon the watermark sequence, where each chunk in a group of chunks includes the same perceptual content encoded using different encoding parameters and is watermarked in the same way, and alternative groups of chunks encode the same perceptual content and differ in the way they are watermarked, and listing the selected chunks in the playlist further includes listing the chunks from the selected groups of chunks in the playlist.

In yet another embodiment, the selected chunks are listed in the playlist using links to the selected chunks of encoded content.

In a further embodiment again, at least one of the links is a single use link.

In another embodiment again, each single use link includes a unique token.

In a further additional embodiment, at least one of the links is a destination link.

In another additional embodiment, each destination link includes a token indicative of a client device.

A still yet further embodiment also includes inserting a playlist-bound key into the playlist.

In still yet another embodiment, selecting between alternative chunks of encoded content based upon the watermark sequence further includes selecting between chunks where each of the alternative chunks is encrypted in a different way.

In a still further embodiment again, each of the alternative chunks is encrypted using a different encryption key.

In still another embodiment again, selection between alternative chunks of encoded content is performed as the watermark sequence is generated.

A still further additional embodiment includes generating a sequence of content keys, selecting between alternative chunks of encrypted content based upon the sequence of content keys, where each of the alternative chunks of encrypted content includes the same perceptual content and is encrypted using a different content key, and listing the selected chunks in a playlist, where content assembled using the playlist requires the sequence of content keys for decryption.

In still another additional embodiment, selection between alternative chunks of encrypted content is performed as the sequence of content keys is generated.

A yet further embodiment again also includes modifying the sequence of content keys by modifying at least one of the content keys using information derived from one of the selected chunks of encrypted content.

In yet another embodiment again, the number of alternative chunks of encrypted content differs for different sections of the content.

A yet further additional embodiment includes encoding sections of the content as alternative chunks of encoded content, where each of the alternative chunks of encoded content includes the same perceptual content and differs in the way it is watermarked, generating a plurality of unique playlists, where each playlist is generated by generating a watermark sequence, where each watermark sequence is a unique identifier, selecting between the alternative chunks of encoded content based upon the watermark sequence, and listing the selected chunks in a playlist, where content assembled using the playlist includes a unique watermark sequence, and providing chunks of content to client devices in accordance with requests made using the plurality of unique playlists, where the content assembled by each client device includes a unique watermark sequence.

Another further embodiment includes a server configured to generate a watermark sequence, where each watermark sequence is a unique identifier. In addition, the server is also configured to select between alternative chunks of encoded content based upon the watermark sequence, where each of the alternative chunks of encoded content includes the same perceptual content and differs in the way it is watermarked, and the server is configured to list the selected chunks in a playlist, where content assembled using the playlist includes a unique watermark sequence.

Still another further embodiment includes a server configured to generate a sequence of content keys. In addition, the server is configured to select between alternative chunks of encrypted content based upon the sequence of content keys, where each of the alternative chunks of encrypted content includes the same perceptual content and is encrypted using a different content key, and the server is configured to list the selected chunks in a playlist, where content assembled using the playlist requires the sequence of content keys for decryption.

Yet another further embodiment includes an encoder configured to encode sections of the content as alternative chunks of encoded content, where each of the alternative chunks of encoded content includes the same perceptual content and differs in the way it is watermarked, a server configured to generate a plurality of unique playlists, where each playlist is generated by generating a watermark sequence, where each watermark sequence is a unique identifier, selecting between alternative chunks of encoded content based upon the watermark sequence, and listing the selected chunks in a playlist, where content assembled using the playlist includes a unique watermark sequence, and a server configured to provide chunks of content to client devices in accordance with requests made using the plurality of unique playlists, where the content assembled by each client device includes a unique watermark sequence.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Turning now to the drawings, systems and methods for enhancing the security of content distribution using individualized playlists are illustrated. In many embodiments, a playlist is individually composed for a client device so that the selection of content included in the playlist encodes information. In a number of embodiments, the playlist encodes information using a sequence of links that refer to chunks, where the referenced chunks include chunks selected from a plurality of alternative chunks that differ in digital watermark information. In several embodiments, the content retrieved using a playlist exhibits an individual sequence of watermarked chunks that encodes information. In a number of embodiments, the playlists includes an individual sequence of links that refer to selections between alternative chunks encrypted with different encryption keys. Accordingly, playback of the content referenced by the playlist involves accessing the content using a unique sequence of content keys.

A playlist in accordance with embodiments of the invention can be utilized in order to avoid the overhead of assembling a unique stream on a server in response to a request for playback by a client device. Instead, a unique playlist can be utilized by the client device or the server (depending on the streaming protocol) to transmit selected chunks of content that result in a uniquely marked and/or encrypted piece of content at the client. The approach is secure, because the client device does not possess information enabling access to the alternative chunks stored on the server that are not referenced by the playlist. The approach can also be efficiently implemented in adaptive streaming systems, because the systems already support the selection of alternative chunks of information in order to adapt to the processing environment and the implementation logic of assembling content from different chunks is already present (either on the client device or the server depending upon the adaptive streaming implementation). Although much of the following discussion relates to adaptive streaming, many embodiments of the invention select between alternative chunks that include the same encoded content (i.e. the content is only available at one bitrate), but include different embedded payload information.

Systems and methods for generating individualized playlists and playing back content using individualized playlists in accordance with embodiments of the invention are discussed further below.

Watermarking Content Using Playlists

Figure 2:
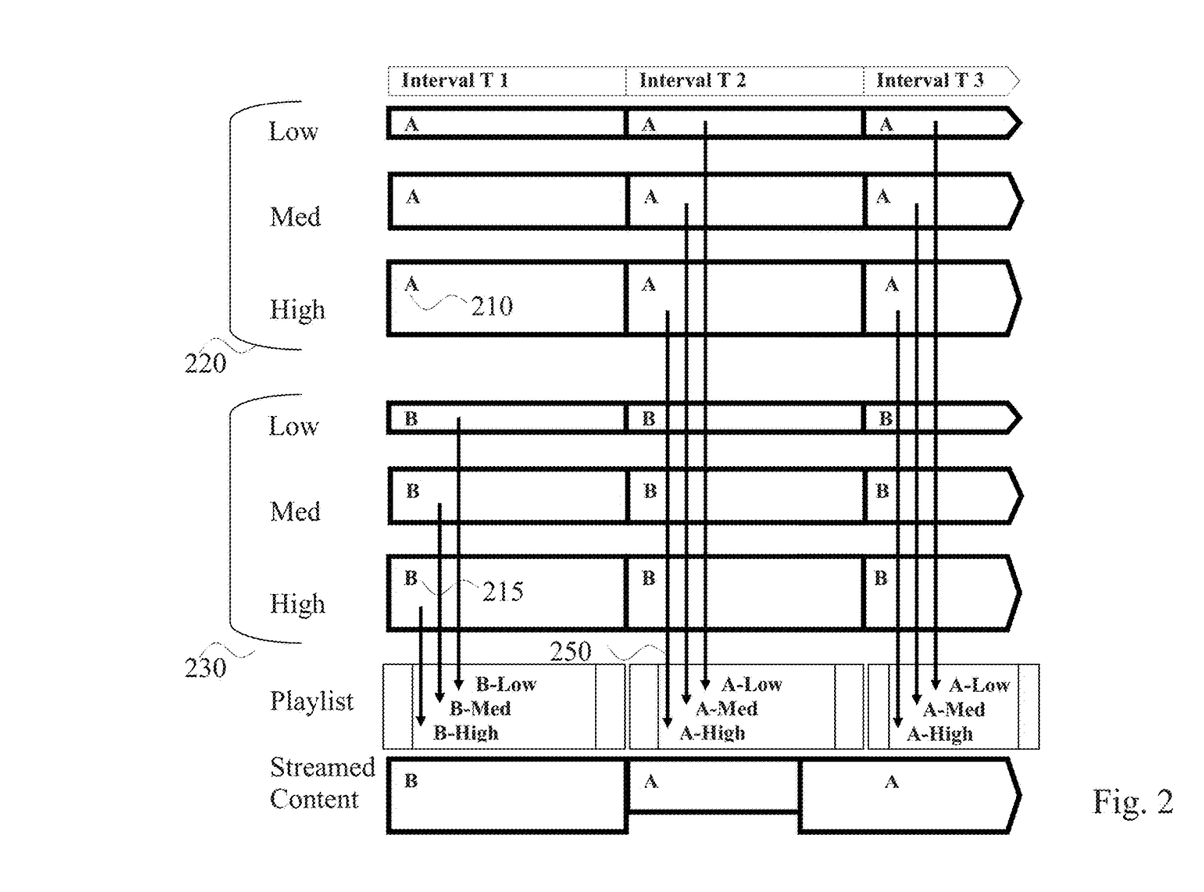
FIG. 2 illustrates process for preparing content for adaptive streaming alternative chunks watermarked with alternative payloads so that each stream includes an individualized watermarking sequence in accordance with an embodiment of the invention.

A process for performing user or client device specific watermarking of content using a playlist in accordance with embodiments of the invention is illustrated in FIG. 2. In this example, for each chunk in FIG. 1 two alternative versions of the chunk are created with different embedded digital watermark information. As a result, two groups 220 and 230 of perceptually similar chunks of content marked with different information A (210) and B (215) are created.

A playlist can be generated such that for each section only chunks with information A or chunks with information B are accessible via the links in the playlist. The watermark sequence (i.e. the sequence of A and B marked chunks) in a file assembled using the playlist is dependent on the links provided in the playlist and not on the specific bitrate of the chunks requested by the client device. In other words, no matter which bandwidth the client is choosing, the sequence of A and B in the resulting file will only depend on the playlist. The specific watermark sequence present in the content file assembled using the playlist provides information that can be used to uniquely identify the user and/or client device that assembled the content. In this way a unique playlist with a unique sequence of chunks marked with A and B watermarking can be generated for each client device or user, and the content streamed using the playlist will include a unique sequence of watermarks. In the illustrated embodiment, the sequence determined by the playlist is B, A, A.

In the embodiment illustrated in FIG. 2, two sets of payload information are used, A and B. In many embodiments, three or more sets of payload information are utilized (e.g. A, B, C, D). In several embodiments, information is embedded using chunks that include one or more alternative embedded payloads and chunks that contain no modification. Yet other embodiments create many alternative chunks in which different payload information is embedded for selected sections, and other sections are not marked. These embodiments vary in complexity and provide different numbers of alternative chunks for different sections of the content and the amount of different information that can be created with a fixed number of sections of content. The sections may be adjusted in length depending on an optimal length to embed the information or depending on other chunking optimization such as imposed by the compression system. The provision of sequences of chunks including marked chunks to client devices for playback in accordance with embodiments of the invention is discussed further below.

Provision of Marked Content to Playback Devices

Figure 3:
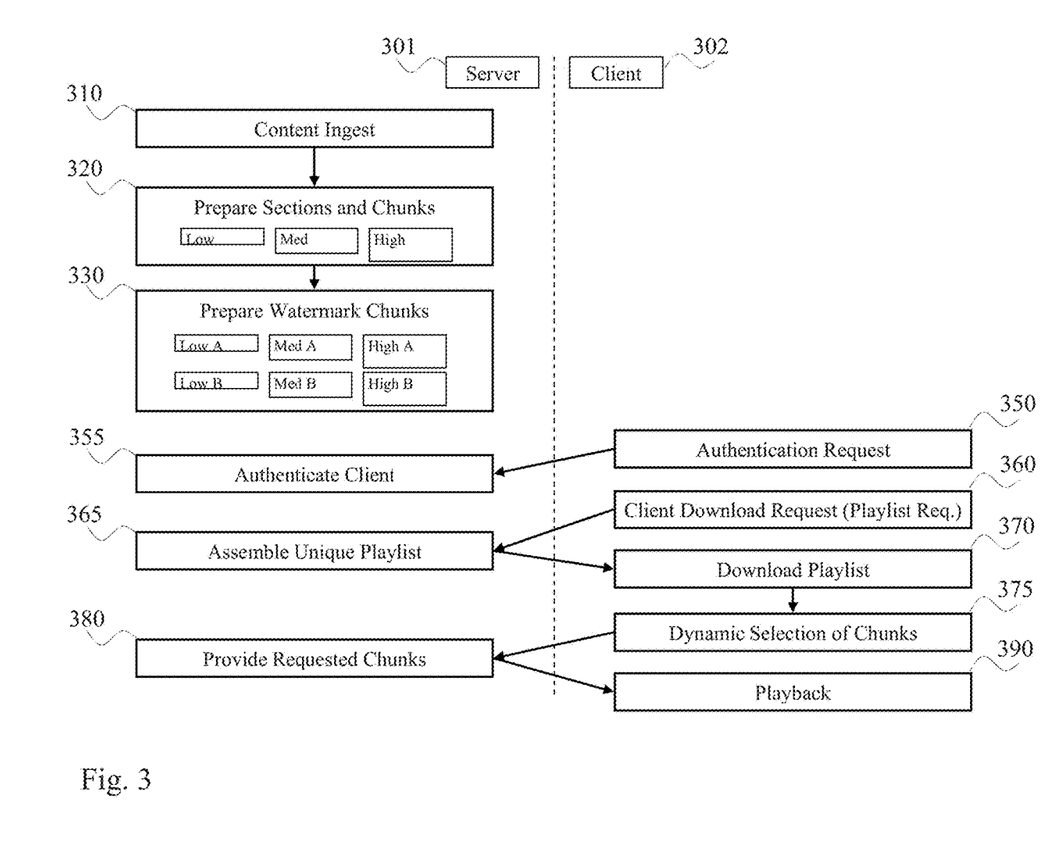
FIG. 3 illustrates a processing sequence and communication between a client and a server for content preparation and delivery via an individualized playlist in accordance with an embodiment of the invention.

The sequence diagram of FIG. 3 shows a process for preparing and streaming content using an individual playlist assembled for a specific client device or user in accordance with an embodiment of the invention. Initially, the content is ingested (310) on the server (301). The server may be operated by a retailer for online video or may be part of a content distribution network (CDN). The ingest (310) typically includes preparing the content for re-distribution with steps including but not limited to localization, adding meta information for ad insertion, program guides, and/or compression. Next, the content is separated into sections and chunks (320) are created from each section. Each chunk can then be used to create (330) multiple alternative watermarked chunks, where each alternative watermarked chunk contains the same encoded content but a different watermark payload. In the illustrated embodiment, six alternative chunks are created from each section of content utilizing three different sets of encoding parameters and two different watermark payloads. In a number of embodiments, the steps (310-330) are performed once per piece of content.

Next, the content is offered for download, typically against a fee, to a known client device or user. The client device or user is authenticated. For example, by providing login information to a website (350) via her client device (302) and the server verifies her credential (355). She makes a content choice that she would like to download and/or playback. This will trigger the client device to first request (370) a playlist. A playlist is assembled on the server in a manner unique to the requesting client or user (365). The individualized playlist is then provided to the client device to enable the download/streaming (370) of the content. During playback, the client device can dynamically select chunks to download (375) from the links provided in the playlist. The server does not require any processing for a specific connection to the client but provides the chunks requested by the client (380). The client device can then play back the chunks after download (390).

Although the client device utilizes the playlist in the process illustrated in FIG. 3, in embodiments where the server determines the chunks to stream in response to a request to switch streams from the client, the server can utilize a unique playlist to select chunks of content to stream to the client device. In addition, the preparation of chunks in different bitrates or different watermarked chunks can be performed after the client has requested the playlist. This will reduce the amount of data that is permanently kept as stored chunks at the expense of increasing the processing load for each playlist request. In several embodiments, the unique playlist is assembled (365) before a client request and supplied to the next client upon request. The unique information associated with the playlist is then associated with the client by storing a record of the playlist that the client received. In yet further embodiments, the steps are performed on different servers. In many embodiments, the content preparation (310, 320, 330) is performed on a first server(s) and the delivery steps (355, 365, 380) are performed on a second server(s).

In yet further embodiments, a playlist is delivered and contains all links to differently marked chunks and the client selects the links that correspond to the content it should assemble. This will reduce the processing required on the server. This is particularly interesting, if the execution and interpretation at the client can be secured against readout and manipulation.

System Architecture

Figure 4:
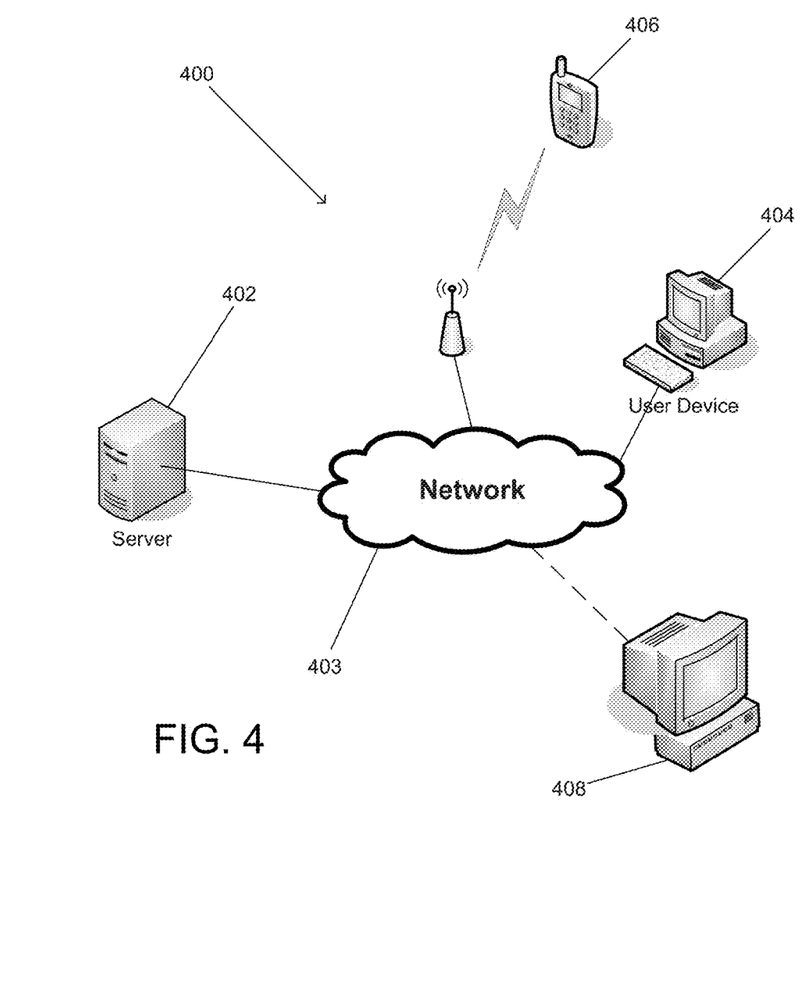
FIG. 4 illustrates a network diagram showing a system for playing back content using an individualized playlist in accordance with an embodiment of the invention.

A system that can be used to prepare and download content for playback in accordance with an embodiment of the invention is illustrated in FIG. 4. The system 400 includes a server 402 connected to a variety of client devices via a network 403, such as the Internet. In the illustrated embodiment, the client devices include a personal computer 404, a mobile phone 406, and a consumer electronics device 408 such as a set top box, a DVD player, a Blu-ray player, a game console or an Internet connected television. Although specific playback devices are illustrated in FIG. 4, any of a variety of client devices capable of communicating with a server and downloading content can be utilized in accordance with embodiments of the invention. Although a specific system architecture is illustrated in FIG. 4, any of a variety of architectures appropriate to the streaming or downloading of content to a playback device can be utilized in accordance with embodiments of the invention.

Embedding Payload Information in Real Time

In several embodiments, alternative chunks containing different payload information for different sections of a piece of content are not preprocessed prior to being accessed but are marked upon receipt of a request for a specific chunk from the client (i.e. on the fly). In order to do so, the server is aware of the information that is used to prepare every chunk that is requested. In a number of embodiments, the information that is embedded is transmitted to the server with the link that is used to access the chunk of content. The link, therefore, includes several parts. One part of the link identifies the chunk to be accessed and another part contains information indicative of the data to be embedded. The payload to be embedded in the chunk can be inserted into the link by the client, or the link can include a unique identifier that enables the server to determine the information to be embedded in the chunk. The preparation of the chunk on the fly can include the marking, encryption and/or transcoding of a section of content.

Encryption of Alternative Chunks of Content

Encryption can be used to obfuscate and scramble digital content such that the encrypted file is not useful unless the decryption mechanism and keys used for decryption are known. Encryption is often used to provide protection against unauthorized use and distribution of content. Typically the content is encrypted once using one or more content keys and the same file is distributed to all users. The content key(s) is encrypted using one or more keys that are unique to a specific user or client device and the encrypted content key(s) is delivered securely and individually to the user and/or client device. A potential problem with using a single content key or set of content keys to encrypt a widely distributed piece of content is that the security of the content is compromised if the content key(s) are obtained in the clear (i.e. unencrypted) by a user, who then shares the content keys with other users. The unencrypted content key(s) can then be used to decrypt the content by users, who have not been granted permission to play back the content by the content creators or owners of the content.

In many embodiments, chunks of content corresponding to the same section of a piece of content can be encrypted with different encryption keys and/or encryption algorithms. The encrypted chunks can be used to specify the assembly of uniquely encrypted files without individually encrypting the content for each client device. Referring back to the embodiment illustrated in FIG. 2, each group of chunks 220, 230 in each section can be encrypted with a different content key or different set of encryption keys. For example, a first group of chunks (220) can be encrypted with a set of content keys $K_A$ and a second group of chunks (230) can be encrypted with set of content keys $K_B$. In which case, decryption of the entire streamed file (B, A, A) utilizes the following content keys: $K_{B1}$ for section T1, $K_{A2}$ for section T2 and $K_{A3}$ for section T3. Different content keys can be used to encrypt each section of the content. For example, a first group of chunks (220) corresponding to three sections of a piece of content can be encrypted using a set of three content keys $K_{A1}$, $K_{A2}$, and $K_{A3}$, and a second group of chunks (230) corresponding to the three sections of content can be encrypted using a second set of content keys $K_{B1}$, $K_{B2}$, and $K_{B3}$. Accordingly, decryption of the same file could involve the following content keys: Km for section T1, $K_{A2}$ for section T2 and $K_{A3}$ for section T3. The keys between sets (A and B) as well as within sets (A1, A2) are commonly different to provide the maximal variation in keys and provide a higher level of security. In the event that a first client obtained the content keys in the clear, another client would receive chunks in accordance with a different playlist configured so that different keys are utilized during decryption. This enhances the security of the resulting delivered file because the keys required can be unique for every client and simply sharing the content keys amongst different clients is unlikely to enable decryption of content obtained from a server in its entirety. When encryption is performed in a manner similar to that outlined above, the playlist and a content key table can be assembled uniquely for every client; an operation that can be performed very efficiently. As can be readily appreciated, individualized playlists can be utilized to enable adaptive streaming, variation in content key sequence, and/or watermarking. In many embodiments, the length of the chunks may be different for each of the applications.

In the embodiment illustrated in FIG. 2, two sets of keys are used, A and B. In many embodiments, three or more keys are utilized (e.g. A, B, C, D). In several embodiments, information is embedded using chunks that are encrypted using one or more keys and chunks that remain unencrypted. Yet other embodiments create many alternative chunks in which different keys are used for selected sections, and other sections are encrypted with a single key only. Some sections may also be encrypted with keys unique to an individual client. These embodiments vary in complexity and provide different numbers of alternative chunks for different sections of the content and effectively increase the difficulty to decrypt the content by combining different playlists. And keys may change over time and different representations of the same content on different servers may use different keys (e.g., in a content distribution network). The sections may be adjusted in length depending on an optimal length to archive the maximal impact of the key selection or depending on other chunking optimization such as imposed by the compression system. The number of keys may also be temporarily reduced in order to increase delivery performance by enabling improved caching for a limit time.

Another variation to enhance the security of the delivery is to use different keys for different quality levels of the content. While there is a risk that the client is manipulated to always retrieve the same content and therefore maximize the probability of matching keys between the content retrieved by two clients, this represents another hurdle at the client and makes an attack harder, since typically the sequence of quality levels is determined by client capabilities and network conditions. Referring to FIG. 2 the keys for section T1 of Low, Med and High segments would be different and even if a second client uses the same group (e.g. A), that client would not be able to use the keys from the first client if they requested different chunks of this segment.

Incorporating Single Use Links in Individualized Playlists

The security of distributed content can be enhanced by utilizing single use or "one-time" links in a playlist in accordance with embodiments of the invention. The single use link is created and recorded when a user and/or a client device requests a piece of content. In several embodiments, the link includes several parts. One part of the link indicates the chunk to be accessed and another part contains a token that is a piece of information that is unique to any link pointing to this chunk. After that chunk has been access using this token, the server registers that the token has been used to retrieve the chunk and does not allow access to this chunk using the same token again. The token can also be secured such that a random piece of information will not be considered a valid token by the server, because it has not been presented before. This can be accomplished with a token white list or by digitally signing the token. Single use links can be useful for identifying alternative chunks in which watermarking is utilized to embed payload information and/or alternative chunks that are encrypted using different content keys or different sets of content keys in accordance with embodiments of the invention.

Incorporating Destination Links in Individualized Playlists

The security of content distribution can be further enhanced by using destination links (i.e. links in the playlist that can only be used from a specific destination) in accordance with embodiments of the invention. Destination links are described in detail in U.S. Provisional Patent Application No. 61/333,909 entitled "Securing Content Access Using Destination Links", filed May 12, 2010, the disclosure of which is incorporated by reference above. A destination link can be created when a client requests playback of a specific piece of content. The destination link can incorporate destination properties of the requesting clients such as its IP address or port or a combination of HTTP request components, MAC address, cookie, device ID/serial number or user credentials. Accordingly, the link includes several parts. One part of the Link indicates the chunk to be accessed and another part contains information indicative of a destination property. In several embodiments, the destination property is secured against tampering by obfuscation (e.g. using a secure hash). When a chunk is accessed using a destination link, the server will only provide the requested data if the request from the client device matches the destination encoded in the link. Destination links can be useful for identifying alternative chunks in which watermarking is utilized to embed payload information and/or alternative chunks that are encrypted using different content keys or different sets of content keys in accordance with embodiments of the invention.

Incorporating Obfuscated Links in Individualized Playlists

The security of distributed content can also be enhanced using obfuscated links (i.e. links that have no obvious connection to the data that is retrieved) in accordance with embodiments of the invention. Instead of using a link that can be interpreted, such as:

http://server.com/movie=content1.mp4&chunk=10&key=B10 an obfuscated link can be generated and utilized, such as:

http://server.com/movie=content1.mp4&token=x12ywe23e where the token x12ywe23e points to the requested chunk (e.g. chunk=10 and encryption key=B10) in a way that can only be resolved on the server by a lookup or process such as encryption or hashing. Although obfuscation using tokens is described above, obfuscations using any of a variety of techniques that provide information to a server as part of a link can be utilized in accordance with embodiments of the invention.

Encrypted Playlists

Security can be further enhanced by encrypting individualized playlists distributed to client devices, so that the playlist can only be read and executed by a specific client device or user qualified by the possession of a key bound to the client device or specific to the user. The key may be symmetric or asymmetric.

Playlist-Bound Keys

Security can also be enhanced using playlist-bound keys, which contain information unique to the playlist such that the server can verify the identity of playlist from which content requests originate. A playlist-bound key can be a number embedded in the playlist during the creation of the playlist, or a hash code of the playlist or a portion of the playlist stored by or capable of being re-generated by the server. The number can be embedded in a single location within the playlist and utilized by the client device to generate content requests or can be a part of every link contained in the playlist. When the playlist-bound key is present in each link within the playlist, the playlist-bound key is typically a separate parameter in the link or combined with, for example, a token in the link or other already existing elements in the link. Although tokens are described above, any technique for binding a key to a playlist that is appropriate to a specific application can be utilized in accordance with embodiments of the invention.

Chunk-Bound Keys

Security may also be enhanced using chunk-bound keys, which are keys that are modified/obfuscated based upon the content of a chunk and can only be used if the appropriate content chunk is present. This binding can occur by a process of an XOR combination with one or several sections of the chunk or a hash code of the chunk. Consequently, the key cannot be used in a different context on another chunk. One scenario where this is relevant is where the same key is used for differently marked content, such that the content varies while the key used to encrypt the alternative chunks of content does not vary. By using the marked content (or unmarked content) to modify the key, the keys received by the client device vary for every variation of the chunk even though the same key is used to encrypt the content. The process used to modify the key can be undone at the client device using information derived from the received chunk. The process reduces the likelihood that modified, delivered keys can be shared between differently marked or compressed chunks.

Applications

The systems and techniques described above can be used in several different applications. In many embodiments, the system is used to track unauthorized distribution of secret or copyrighted information. A problem that faces many industries is the unauthorized distribution of information. Systems and processes in accordance with embodiments of the present invention can be used to embed marks in media information at the time of delivery of the content. Each distributed copy can be uniquely marked with information such as a recipient identification number and a time stamp. If the copy is publicly available or in the possession of an entity or individual that is not authorized to possess the information, the information can be uncovered and the entity or person that is the recipient of the media and the likely source of the unauthorized distribution can be identified.

In many instances, the secret or copyrighted information is passed between several different entities and/or individuals during production and authorized distribution. In several embodiments, the point from which the information was distributed without authorization can be ascertained by embedding a mark associated with the last recipient of the information prior to delivery or display. The entity or individual that is responsible for the unauthorized distribution can then be identified based upon the last mark added to the content.

A common instance, in which copyrighted information is communicated, is the distribution of copyrighted media via a network to a media player. In many embodiments, the player is a consumer electronics device such as a set top box or a personal computer. A mark can be embedded in the media in accordance with embodiments of the invention. The mark can contain information relating to the owner of the player and information identifying the time of transmission or playback. If the recipient of the information is known, the information to be embedded can be generated by the server (or head end) providing the media. The embedded information can also be stored by the server in a database that contains additional information about the transaction, such as the user's billing information and details about the receiving device. In other embodiments, the player maintains information such as player identification number and time, which is embedded as a mark during storage and/or playback.

Another instance in which unauthorized distribution is a common problem is in the production of media. During production, content is particularly vulnerable to unauthorized distribution that can cause considerable damage to the producer of the media. In many embodiments, marks are embedded in the media during various stages of production that identify the recipient of the media and the time of the receipt of the media. If the copy is made publicly available, the mark can be uncovered and the responsible person or entity can be identified.

Although the present invention has been described in certain specific aspects, many additional modifications and variations would be apparent to those skilled in the art. It is therefore to be understood that the present invention may be practiced otherwise than specifically described, including various changes in the implementation. Thus, embodiments of the present invention should be considered in all respects as illustrative and not restrictive.

What is claimed:

1. A method of generating a unique playlists, where content assembled using the playlist includes a unique watermark sequence, and the method of generating the unique playlist comprises:
   generating a unique watermark sequence using a server, where the unique watermark sequence is a unique identifier for a client device;
   encoding, using the server, a plurality of alternative groups of chunks of encoded content for each of a plurality of sections of a piece of content, where each of the alternative groups of chunks contains a plurality of chunks having different embedded digital watermark information from chunks in another alternative group of chunks, and where each chunk within an alternative group of chunks includes the same perceptual content encoded using the same embedded digital watermark information but encoded at a different bitrate using different encoding parameters as another chunk within the alternative group of chunks;
   selecting an alternative group of chunks from the plurality of alternative groups of chunks for each of the plurality of sections of the piece of content based upon the unique watermark sequence using the server;
   listing the selected chunks from the selected alternative groups of chunks in a playlist using the server, where the sequence of chunks assembled in the playlist is based on the unique watermark sequence;
   sending the playlist to the client device.

2. The method of claim 1, wherein at least one of the alternative groups of chunks includes an imperceptibly embedded watermark, and at least one of the alternative groups of chunks is unmodified.

3. The method of claim 1, wherein each of the alternative groups of chunks includes a different imperceptibly embedded watermark.

4. The method of claim 3, wherein each of the alternative groups of chunks includes a different amount of embedded information.

5. The method of claim 1, wherein the number of alternative groups of chunks differs for different sections of the content.

6. The method of claim 1, wherein the selected chunks are listed in the playlist using links to the selected chunks of encoded content.

7. The method of claim 6, wherein at least one of the links is a single use link.

8. The method of claim 7, wherein each single use link includes a unique token.

9. The method of claim 6, wherein at least one of the links is a destination link.

10. The method of claim 9, wherein each destination link includes a token indicative of a client device.

11. The method of claim 1, further comprising inserting a playlist-bound key into the playlist.

12. The method of claim 1, wherein selecting an alternative group of chunks from the plurality of alternative groups of chunks for each of the plurality of sections of the piece of content based upon the unique watermark sequence further comprises selecting between alternative groups of chunks where each of the alternative groups of chunks is encrypted in a different way.

13. The method of claim 12, wherein each of the alternative groups of chunks is encrypted using a different encryption key.

14. The method of claim 1, wherein selection of an alternative groups of chunks is performed as the unique watermark sequence is generated.

15. The method of claim 1 wherein listing the selected chunks from the selected alternative groups of chunks in a playlist using the server comprises listing, in an M3U playlist file, URLs pointing to the selected chunks from the selected alternative groups of chunks.

16. The method of claim 1, wherein selecting chunks to download using the client device based upon the playlist comprises identifying a bitrate for chunks to select, and the method further comprises:
receiving a request for a chunk of encoded content from the client device, where the request comprises a token that specifically identifies the client device;
determining a set of watermark information to be associated with the chunk of encoded content based on the received token; and
sending to the client device a chunk of encoded content marked with the determined set of watermark information.

17. The method of claim 16, wherein the token is part of a URL link.

18. The method of claim 16, wherein the request is a first request in a sequence of requests for a sequence of chunks of encoded content, each request comprising a corresponding token;
wherein determining the set of watermark information to be associated with the chunks of encoded content comprises identifying a unique watermark sequence of sets of watermark information to be associated with the chunks of encoded content, where each set of watermark information for a chunk is based on the corresponding token in the request for that chunk.

19. The method of claim 18, further comprising rejecting the request when a previous request has used the same token.

20. The method of claim 16, wherein the token is obfuscated to hide information stored in the token.

21. The method of claim 20, wherein the token is digital signed to obfuscate the stored information.

22. The method of claim 1, further comprising storing the plurality of alternative groups of chunks of encoded content in a single file by the server.

23. The method of claim 1, further comprising selecting chunks to download using the client device based upon the playlist and retrieving the selected chunks by requesting byte ranges from the server.

24. A method of providing content for downloading using a plurality of unique playlists, comprising:
encoding a plurality of sections of a piece of content, using a server, as a plurality of alternative groups of chunks, where each of the alternative groups of chunks contains a plurality of chunks having different embedded digital watermark information from chunks in another alternative group of chunks, and where each chunk within an alternative group of chunks includes the same perceptual content encoded using the same embedded digital watermark information but encoded at a different bitrate using different encoding parameters as another chunk within the alternative group of chunks;
generating a plurality of unique playlists using the server, where each unique playlist is generated based upon a corresponding unique watermark sequence by:
generating a unique watermark sequence using the server, where each watermark sequence is a unique identifier for a client device;
selecting an alternative group of chunks from the plurality of alternative groups of chunks for each of the plurality of sections of the piece of content based upon the unique watermark sequence using the server; and
listing the selected chunks from the selected alternative groups of chunks in a unique playlist, where the sequence of chunks assembled in the playlist is based on the unique watermark sequence;
providing each of the plurality of unique playlists to each of a plurality of client devices using the server.

25. The method of claim 24 wherein listing the selected chunks from the selected alternative groups of chunks in a playlist comprises listing, in an M3U playlist file, URLs pointing to the selected chunks from the selected alternative groups of chunks.

26. A system configured to generate a plurality of unique playlists, where content assembled using each playlist includes a unique watermark sequence, the system comprising:
a server configured to generate a unique watermark sequence using a processor on the server, where each unique watermark sequence is a unique identifier for a client device;
wherein the server is also configured to encode a plurality of alternative groups of chunks of encoded content for each of a plurality of sections of a piece of content using the processor, where each of the alternative groups of chunks contains a plurality of chunks having different embedded digital watermark information from chunks in another alternative group of chunks, and where each chunk within an alternative group of chunks includes the same perceptual content encoded using the same embedded digital watermark information but encoded at a different bitrate using different encoding parameters as another chunk within the alternative group of chunks;
wherein the server is also configured to select an alternative group of chunks from the plurality of alternative groups of chunks for each of the plurality of sections of the piece of content based upon the unique watermark sequence, using the processor;
wherein the server is configured to, using the processor:
list the selected chunks from the selected alternative groups of chunks in a playlist, where the sequence of chunks assembled in the playlist is based on the unique watermark sequence;
send the playlist to a client device; and
send chunks to the client device in response to requests for the chunks, where the client device does not possess information enabling access to chunks in the alternative groups of chunks stored on the server that are not referenced by the playlist.

27. The system of claim 26 wherein the server being configured to list the selected chunks from the selected alternative groups of chunks in a playlist comprises the server being configured to list, in an M3U playlist file, URLs pointing to the selected chunks from the selected alternative groups of chunks.

\* \* \* \* \*